United States Patent
Meyer et al.

(10) Patent No.: US 11,522,772 B2
(45) Date of Patent: Dec. 6, 2022

(54) SYSTEMS AND METHODS FOR RAPID BOOTING AND DEPLOYING OF AN ENTERPRISE SYSTEM IN A CLOUD ENVIRONMENT

(71) Applicant: Fidelity Information Services, LLC, Jacksonville, FL (US)

(72) Inventors: Scott Meyer, Jackson, WI (US); Fiaz Sindhu, Jacksonville, FL (US); Giacomo Novielli, St. Augustine, FL (US); Miriyala Madhav, Bangalore (IN)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 17/240,682

(22) Filed: Apr. 26, 2021

(65) Prior Publication Data
US 2021/0250256 A1 Aug. 12, 2021

Related U.S. Application Data

(63) Continuation of application No. 16/251,195, filed on Jan. 18, 2019, now Pat. No. 11,018,956.

(51) Int. Cl.
*H04L 41/5054* (2022.01)
*H04L 41/08* (2022.01)
(Continued)

(52) U.S. Cl.
CPC ........ *H04L 41/5054* (2013.01); *G06F 9/4416* (2013.01); *G06F 9/44526* (2013.01);
(Continued)

(58) Field of Classification Search
CPC ............. H04L 41/5054; H04L 41/0886; H04L 41/0889; H04L 41/5029; H04L 67/34;
(Continued)

(56) References Cited

U.S. PATENT DOCUMENTS

| 2015/0067686 A1* | 3/2015 | Davis ................. G06F 9/45516 718/100 |
| 2017/0220011 A1 | 8/2017 | Hart et al. |

(Continued)

OTHER PUBLICATIONS

"Microservices" edited by Grayfell on Jan. 17, 2019 https://en.wikipedia.org/w/index.php?title=Microservices&oldid=878802886 (8 pages).

(Continued)

*Primary Examiner* — Joe Chacko
(74) *Attorney, Agent, or Firm* — Finnegan, Henderson, Farabow, Garrett & Dunner, LLP

(57) ABSTRACT

The present disclosure relates to systems and methods for deploying enterprise systems in cloud environments. In one implementation, a system for deploying an enterprise system in a cloud environment may include at least one processor configured to provide: one or more first containers hosting at least one application with at least one enterprise function; one or more second containers hosting at least one microservice configured to activate the at least one enterprise function; at least one application programming interface (API) between the at least one microservice and at least one client; and at least one gateway configured to manage access to the at least one API.

21 Claims, 9 Drawing Sheets

(51) Int. Cl.
  *H04L 41/50*    (2022.01)
  *G06F 9/445*    (2018.01)
  *G06Q 40/02*    (2012.01)
  *H04L 67/00*    (2022.01)
  *G06F 9/455*    (2018.01)
  *G06F 9/4401*   (2018.01)

(52) U.S. Cl.
  CPC ......... *G06F 9/45558* (2013.01); *G06Q 40/02* (2013.01); *H04L 41/0886* (2013.01); *H04L 41/0889* (2013.01); *H04L 41/5029* (2013.01); *H04L 67/34* (2013.01); *G06F 2009/45562* (2013.01)

(58) Field of Classification Search
  CPC . H04L 41/0806; H04L 63/0428; H04L 63/08; H04L 67/10; H04L 67/1097; G06F 9/4416; G06F 9/44526; G06F 9/45558; G06F 2009/45562; G06F 2009/4557; G06F 2009/45587; G06F 9/45533; G06Q 40/02
  See application file for complete search history.

(56) References Cited

U.S. PATENT DOCUMENTS

| | | | |
|---|---|---|---|
| 2018/0278705 A1* | 9/2018 | Wagenknecht | G06F 9/546 |
| 2018/0321918 A1 | 11/2018 | McClory et al. | |
| 2019/0361748 A1* | 11/2019 | Walters | H04L 67/10 |
| 2022/0132194 A1* | 4/2022 | Aimone | H04N 21/43072 |

OTHER PUBLICATIONS

European Search Report for European Patent No. 20741266.9 dated Sep. 14, 2022 (12 pages).

\* cited by examiner

SYSTEMS AND METHODS FOR RAPID BOOTING AND DEPLOYING OF AN ENTERPRISE SYSTEM IN A CLOUD ENVIRONMENT

CROSS-REFERENCE TO RELATED APPLICATIONS

This application is a continuation of U.S. patent application Ser. No. 16/251,195, filed on Jan. 18, 2019, entitled "SYSTEMS AND METHODS FOR RAPID BOOTING AND DEPLOYING OF AN ENTERPRISE SYSTEM IN A CLOUD ENVIRONMENT." The aforementioned application is incorporated herein by reference in its entirety.

TECHNICAL FIELD

The present disclosure generally relates to computerized methods and systems for deploying enterprise systems and, more particularly, related to computerized methods and systems for rapidly booting up an enterprise system agnostic to a cloud environment.

BACKGROUND

Many industries use systems built around processing cores to integrate different parts of a distributed system. For example, a utility company may use an energy core to track resource extraction, power plants, transmission lines, and the like using an integrated system. In another example, an insurance company may use an insurance core to track premiums, investments, customer information, and the like in an integrated and unified manner. Similarly, a bank may use a banking core to track deposits, interests, transactions, accounts, customer information, and the like. Indeed, any enterprise system may include a core to provide integration across the enterprise applications and services.

Processing cores and enterprise systems are typically very costly to set up. The time-cost often exceeds months, and the process generally requires extensive manual intervention. Moreover, an entire business may be rendered nonfunctional, to differing degrees, if the enterprise system crashes, either in whole or in part, during the lengthy time required to re-establish the enterprise system. Further, peripheral systems, such as a website for customers, mobile hardware devices connected to the enterprise system, and the like may be unusable due to the outage. An on-demand backup enterprise system using traditional architecture would be costly to set up leading to delays in bringing systems online if the crash is long-term. So, traditionally, organizations avoid time-delay by employing a second, pre-established enterprise system for use in the case of a catastrophic event. This results in wasted infrastructure that is not used most of the time.

The inventors recognized a need to quickly and efficiently deploy enterprise systems and backup enterprise systems for initial deployment, system upgrades, and during cases of catastrophic outage. Existing enterprise systems employ architectures that result in a heavy time-cost (e.g., on the order of weeks or months) to set up or update and generally require close human supervision and manual review, e.g., of importing data and of importing custom applications, services, and configurations for the enterprise core. Existing enterprise systems cannot be deployed on the order of hours due, in part, to the need for human supervision and manual porting of custom applications and services.

SUMMARY

The inventors recognized that to boot a new enterprise system on a short time scale, such as hours, providing a cloud-based system would be beneficial. Further, the inventors recognized the need for a cloud-agnostic system. Accordingly, the inventors developed computerized methods and systems using containerization to quickly and efficiently deploy a new enterprise system on the order of hours without a need for human supervision and manual review of data and importing of custom applications and services.

The inventors also recognized that further efficiencies may be provided by using a platform engine with customizable extensions, such as plug-in applications and data structure extensions. These extensions may be configured in accordance with a plurality of constructs provided by the platform engine. Accordingly, the inventors developed computerized methods and systems capable of using a common processing engine to further reduce a need for manual porting of many custom applications and services.

The disclosed embodiments are directed to computerized methods and systems for deploying an enterprise system in a cloud environment. For illustrative purposes only, some exemplary embodiments are described using a banking core. However, any other enterprise-based technology, such as a utility core, a mining core, a military core, an insurance core, a search engine core, or the like may be deployed rapidly using the embodiments disclosed herein.

The disclosed embodiments include a system for deploying an enterprise system in a cloud environment. The system may comprise at least one processor configured to provide: one or more first containers hosting at least one application with at least one enterprise function; one or more second containers hosting at least one microservice configured to activate the at least one enterprise function; at least one application programming interface (API) between the at least one microservice and at least one client; and at least one gateway configured to manage access to the at least one API.

In some embodiments, each container of the one or more first containers may host only one application. In other embodiments, at least one of the one or more first containers may host more than one application.

In any of the embodiments described above, the at least one application may comprise an application implementing authentication of one or more administrators of the enterprise system or an application implementing authentication of one or more customers of the enterprise system. Additionally or alternatively, the at least one application may comprise a platform layer with one or more extensions. In such embodiments, the one or more extensions may comprise one or more integrated extensions. For example, the one or more extensions may comprise at least one of a geography-specific extension, an institution-specific extension, or a data structure-specific extension. In such embodiments, the data structure-specific extension may comprise at least one of a customer data structure specific extension, an organization data structure specific extension, an alert data structure specific extension, or a ledger data structure specific extension.

In any of the embodiments described above, the platform layer may comprise a plurality of construct sets. For example, the plurality of construct sets may comprise a product definition construct set, an arrangement management construct set, and a transaction processing construct set. Additionally or alternatively, the plurality of construct sets may comprise at least one of a pricing definition construct set or an account processing construct set.

In any of the embodiments described above, the at least one processor may be further configured to provide one or more virtual data stores accessible by the one or more first containers. The one or more virtual data stores may comprise data from at least one backup file parsed into a format associated with the enterprise system. In such embodiments, the data of the one or more virtual data stores may comprise data in a first encrypted format, and the at least one backup file may comprise a file in a second encrypted format different from the first encrypted format.

In any of the embodiments described above, each container of the one or more second containers may host only one microservice. In other embodiments, at least one of the one or more second containers may host more than one microservice.

In any of the embodiments described above, at least one container of the one or more first containers or the one or more second containers may be scaled. In such embodiments, the scaling may be based on a measured performance indicator. Additionally or alternatively, the scaled at least one container may comprise at least one duplicated container having a corresponding duplicated application or a corresponding duplicated microservice hosted therein.

In any of the embodiments described above, the at least one client may comprise an input device. In such embodiments, the input device may comprise a device associated with a customer, a device associated with an employee, or a device associated with a system administrator. In embodiments including an input device, the at least one microservice may be configured to activate the at least one enterprise function of the at least one application based on input from the input device.

In any of the embodiments described above, the at least one client may comprise a system external to the enterprise system.

In any of the embodiments described above, the at least one gateway may comprise a unified gateway providing log-in services to the at least one client. Additionally or alternatively, the at least one gateway may apply one or more access policies to determine whether the at least one client is permitted to access the at least one microservice through the at least one API.

In any of the embodiments described above, the enterprise system may comprise a banking core. In such embodiments, the at least one application may comprise an application implementing authentication of one or more administrators of the banking core, an application implementing deposits for the banking core, or an application implementing authentication of one or more customers of the banking core.

In any of the embodiments described above, the at least one application may provide at least one peripheral processing function; the at least one microservice may be configured to process input from and output to at least one peripheral system and in communication with the at least one application; and the at least one processor may be further configured to provide at least one communication channel with the at least one peripheral system. In such embodiments, the at least one communication channel may be configured to receive input from the at least one peripheral system and to transmit output from the at least one microservice to the at least one peripheral system.

In such embodiments, the at least one application may comprise an automated clearing house (ACH) incoming file application, an ACH outgoing file application, an ACH incoming return application, or an ACH outgoing return application. Additionally or alternatively, the at least one microservice may comprise a batch scheduler for ACH incoming files, or a batch scheduler for ACH outgoing files. In such embodiments, the batch scheduler may be connected though a secure channel to a clearing house (CH).

Additionally or alternatively, the at least one application may comprise an automated teller machine (ATM) withdrawal application, or an ATM deposit application. Additionally or alternatively, the at least one microservice may comprise a scheduler for ATM deposits, or a scheduler for ATM withdrawals. In such embodiments, the scheduler may be connected to at least one peripheral driver associated with at least one ATM.

Additionally or alternatively, the at least one application may comprise a point-of-sale (POS) authentication application, or a card status management application. Additionally or alternatively, the at least one microservice may comprise a scheduler for POS transactions, or a scheduler for card status updates. In such embodiments, the scheduler may be connected to at least one peripheral driver associated with at least one POS system.

Additionally or alternatively, the at least one application may comprise an incoming substitute check file application, an outgoing substitute check file application, an incoming substitute check return application, or an outgoing substitute check return application. Additionally or alternatively, the at least one microservice may comprise a batch scheduler for substitute check incoming files or a batch scheduler for substitute check outgoing files. In such embodiments, the batch scheduler may be connected through a secure channel to at least one of a bank or the Federal Reserve.

Additionally or alternatively, the at least one application may comprise a web access authentication application, an account transfer application, or an account history application. Additionally or alternatively, the at least one microservice may comprise an account information retrieval service or an account transaction service.

The disclosed embodiments further include a system for deploying an enterprise system in a cloud environment. The system may comprise at least one memory storing instructions and at least one processor configured to execute the instructions to perform operations. The operations may comprise booting one or more first containers using operating-system-level virtualization, the one or more first containers hosting at least one application with at least one enterprise function; booting one or more second containers using operating-system-level virtualization, the one or more second containers hosting at least one microservice configured to activate the at least one enterprise function of the at least one application; providing at least one application programming interface (API) between the at least one microservice and at least one client; and managing access to the at least one API using at least one gateway.

In some embodiments, each container of the one or more first containers may host only one application. In other embodiments, at least one of the one or more first containers may host more than one application.

In any of the embodiments described above, the at least one application may comprise an application implementing authentication of one or more administrators of the enterprise system or an application implementing authentication of one or more customers of the enterprise system.

In any of the embodiments described above, the at least one application may comprise an application implementing authentication of one or more administrators of the enterprise system or an application implementing authentication of one or more customers of the enterprise system. Additionally or alternatively, the at least one application may comprise a platform layer with one or more extensions. In such embodiments, the one or more extensions may comprise one or more integrated extensions. For example, the one or more extensions may comprise at least one of a geography-specific extension, an institution-specific extension, or a data structure-specific extension. In such embodiments, the data structure-specific extension may comprise at least one of a customer data structure specific extension, an organization data structure specific extension, an alert data structure specific extension, or a ledger data structure specific extension.

In any of the embodiments described above, the platform layer may comprise a plurality of construct sets. For example, the plurality of construct sets may comprise a product definition construct set, an arrangement management construct set, and a transaction processing construct set. Additionally or alternatively, the plurality of construct sets may comprise at least one of a pricing definition construct set or an account processing construct set.

In any of the embodiments described above, the operations may further comprise retrieving at least one backup file in a first format; parsing the at least one backup file into a second format associated with the enterprise system; and storing the parsed at least one backup file in one or more virtual data stores at least partially accessible by the one or more first containers. In such embodiments, the operations may further comprise validating integrity of the at least one backup file before parsing. For example, the validating is based on a hash of the at least one backup file.

In any of the embodiments described above, the at least one backup file is encrypted. In such embodiments, the operations may further comprise decrypting the at least one backup file before parsing; and re-encrypting the parsed at least one backup file into an encryption format associated with the enterprise system. In such embodiments, the operations may further comprise at least one of validating integrity of the encrypted at least one backup file, or validating integrity of the decrypted at least one backup file. For example, the validating may be based on at least one of a hash of the at least one backup file, or one or more tags associated with the at least one backup file.

In any of the embodiments described above, each container of the one or more second containers may host only one microservice. In other embodiments, at least one of the one or more second containers may host more than one microservice.

In any of the embodiments described above, the operations may further comprise scaling at least one container of the one or more first containers or the one or more second containers. In such embodiments, the scaling may be based on a measured performance indicator. Additionally or alternatively, the scaling may comprise duplication of at least one container and a corresponding application or a corresponding microservice hosted therein.

In any of the embodiments described above, the at least one client may comprise an input device. In such embodiments, the input device may comprise a device associated with a customer, a device associated with an employee, or a device associated with a system administrator. In embodiments including an input device, the at least one microservice may be configured to activate the at least one enterprise function of the at least one application based on input from the input device.

In any of the embodiments described above, the at least one client may comprise a system external to the enterprise system.

In any of the embodiments described above, the at least one gateway may comprise a unified gateway providing log-in services to the at least one client. Additionally or alternatively, the at least one gateway may apply one or more access policies to determine whether the at least one client is permitted to access the at least one microservice through the at least one API.

In any of the embodiments described above, the enterprise system may comprise a banking core. In such embodiments, the at least one application may comprise an application implementing authentication of one or more administrators of the banking core, an application implementing deposits for the banking core, or an application implementing authentication of one or more customers of the banking core.

In any of the embodiments described above, the at least one application may provide at least one peripheral processing function; the at least one microservice may be configured to process input from and output to at least one peripheral system and in communication with the at least one application; and the at least one processor may be further configured to provide at least one communication channel with the at least one peripheral system. In such embodiments, the at least one communication channel may be configured to receive input from the at least one peripheral system and to transmit output from the at least one microservice to the at least one peripheral system.

In such embodiments, the at least one application may comprise an automated clearing house (ACH) incoming file application, an ACH outgoing file application, an ACH incoming return application, or an ACH outgoing return application. Additionally or alternatively, the at least one microservice may comprise a batch scheduler for ACH incoming files, or a batch scheduler for ACH outgoing files. In such embodiments, the batch scheduler may be connected though a secure channel to a clearing house (CH).

Additionally or alternatively, the at least one application may comprise an automated teller machine (ATM) withdrawal application, or an ATM deposit application. Additionally or alternatively, the at least one microservice may comprise a scheduler for ATM deposits, or a scheduler for ATM withdrawals. In such embodiments, the scheduler may be connected to at least one peripheral driver associated with at least one ATM.

Additionally or alternatively, the at least one application may comprise a point-of-sale (POS) authentication application, or a card status management application. Additionally or alternatively, the at least one microservice may comprise a scheduler for POS transactions, or a scheduler for card status updates. In such embodiments, the scheduler may be connected to at least one peripheral driver associated with at least one POS system.

Additionally or alternatively, the at least one application may comprise an incoming substitute check file application, an outgoing substitute check file application, an incoming substitute check return application, or an outgoing substitute check return application. Additionally or alternatively, the at least one microservice may comprise a batch scheduler for substitute check incoming files or a batch scheduler for substitute check outgoing files. In such embodiments, the batch scheduler may be connected through a secure channel to at least one of a bank or the Federal Reserve.

Additionally or alternatively, the at least one application may comprise a web access authentication application, an account transfer application, or an account history application. Additionally or alternatively, the at least one microservice may comprise an account information retrieval service or an account transaction service.

DETAILED DESCRIPTION

Figure 1:
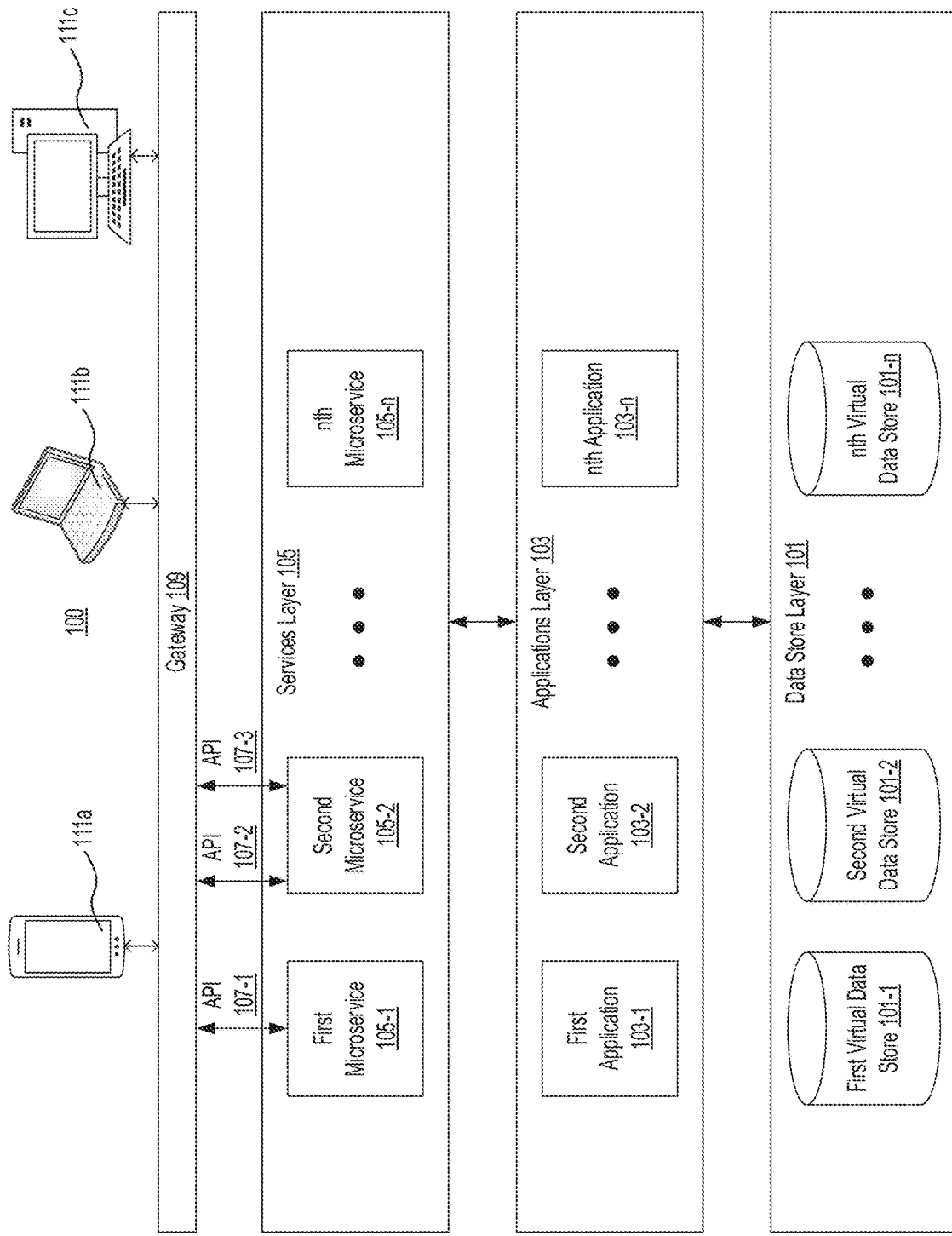
FIG. 1 is a block diagram of an exemplary enterprise system using containerization, consistent with the disclosed embodiments.

The disclosed embodiments include systems, methods, and computer program products for deploying an enterprise system in a cloud environment. For illustrative purpose only, the following description may refer to an enterprise system with a core based on banking functions, e.g., a banking core. However, it is contemplated that the embodiments disclosed herein may be used with any enterprise system, such as a utility core, a mining core, a military core, a search engine core, an insurance core, etc. For example, a utility core may comprise an enterprise system for water purification, electricity distribution and/or generation, telecommunication service provisioning, or any other crucial infrastructure system.

Before explaining certain embodiments of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the accompanying drawings, are for the purpose of description and should not be regarded as limiting.

As such, those skilled in the art will appreciate that the conception upon which this disclosure is based may readily be utilized as a basis for designing other structures, methods, and systems for carrying out the several purposes of the present disclosure.

Reference will now be made in detail to the present exemplary embodiments of the disclosure, examples of which are illustrated in the accompanying drawings. Wherever possible, the same reference numbers will be used throughout the drawings to refer to the same or like parts.

FIG. 1 is a schematic diagram illustrating an enterprise system 100 deployed using containerization, consistent with the disclosed embodiments. For example, the enterprise system 100 may be deployed using method 700 of FIG. 7, described in further detail below. An enterprise system may refer to any combination of hardware and/or software components that integrate and unify a plurality of processes and data storage across an organization or institution. A container may comprise a runtime environment including an application and/or a managed service (as explained below) along with dependencies, libraries, binaries, configuration files, or the like required by the application and/or managed service. Containerization may allow for bundling of an application and/or a managed service along with dependencies, libraries, binaries, configuration files, or the like in a single package. Containerization may allow for implementing an enterprise system without regard to differences in operating system distributions and underlying hardware and software infrastructure.

As depicted in FIG. 1, a data store layer 101 may be formed from a plurality of data stores (e.g., databases, file systems, enterprise storage systems, or the like). Such data stores may comprise virtual data stores provided in a cloud environment in which enterprise system 100 resides. For example, in FIG. 1, layer 101 is formed of first virtual data store 101-1, second virtual data store 101-2, . . . , nth virtual data store 101-n. Additionally or alternatively, data stores may comprise local storage media, such as random access memories (RAMs), read-only memories (ROMs), hard disk drives, flash drives, or the like.

Data store layer 101 may be accessed by an applications layer 103. Applications layer 103 may be formed from a plurality of applications, e.g., first application 103-1, second application 103-2, . . . , nth application 103-n. An application may comprise any set of software instructions causing one or more processors of enterprise system 100 to perform a series of operations. An application may additionally or alternatively include hardware instructions, e.g., on a field-programmable gate array (FPGA) or other application-specific integrated circuit (ASIC).

As depicted in FIG. 1, each application may be self-contained. For example, each application may execute within a container formed using operating-system-level virtualization within the cloud environment in which enterprise system 100 resides. Accordingly, each application may comprise an isolated user-space instance. Although not depicted in FIG. 1, the plurality of applications may communicate with each other in addition to retrieving data from and storing data in data store layer 101.

Applications layer 103 may provide one or more enterprise functions through the applications thereof. Accordingly, services layer 105 may, using the microservices forming the layer (e.g., first microservice 105-1, second microservice 105-2, . . . , nth microservice 105-n), activate the one or more enterprise functions. A microservice may comprise a set of software instructions that allow for activation of functions included in the set(s) of software instructions comprising the application(s). Accordingly, a microservice may comprise any managed service. A microservice may additionally or alternatively include hardware instructions, e.g., on a field-programmable gate array (FPGA) or other application-specific integrated circuit (ASIC).

In some embodiments, a microservice may periodically activate one or more enterprise functions. For example, an interest microservice for a banking core may activate depository and account functions on a monthly basis to automatically calculate interest and update accounts accordingly.

Additionally or alternatively, a microservice may activate one or more enterprise functions based on input from another system. For example, a microservice may activate one or more enterprise functions of a peripheral application in response to input from a peripheral system, as explained below with respect to FIG. 6. In another example, a system external to the enterprise system 100 (e.g., another enterprise system, such as that associated with a bank, an external server, or the like) may send input to a microservice to activate one or more enterprise functions. In yet another example, a microservice may activate one or more enterprise functions in response to input from an input device, such as device 111a, 111b, 111c, or the like.

As depicted in FIG. 1, each microservice may be self-contained. For example, each microservice may execute within a container formed using operating-system-level virtualization within the cloud environment in which enterprise system 100 resides. Accordingly, each microservice may comprise an isolated user-space instance. Although not depicted in FIG. 1, the plurality of microservices may communicate with each other in addition to activating functions of applications within applications layer 103.

Input devices 111a, 111b, and 111c may be associated with one or more administrators of enterprise system 100, one or more employees of enterprise system 100, one or more customers of enterprise system 100, or the like. As depicted in FIG. 1, input devices 111a, 111b, and 111c may use one or more application programming interfaces (APIs) to access services layer 105. An API may comprise any communication protocol between a managed service and a user, a system, or other software invoking the managed service. Although not depicted in FIG. 1, systems external to the enterprise system 100 may also use the one or more APIs to access services layer 105. Each service of the microservices forming services layer 105 may provide one API (e.g., first microservice 105-1 provides API 107-1), a plurality of APIs (e.g., second microservice 105-2 provides APIs 107-2 and 107-3), or no APIs (e.g., nth microservice 105-n provides no APIs).

As further depicted in FIG. 1, at least one gateway, such as gateway 109, may provide authentication services such that input devices 111a, 111b, and 111c (and systems external to the enterprise system 100) and may access the one or more APIs. A gateway may comprise a set of software instructions that provide a link between an application on the client (e.g., input devices 111a, 111b, and 111c and/or systems external to the enterprise system 100) and an API on enterprise system 100 by which a microservice may be accessed. A gateway may additionally or alternatively include hardware instructions, e.g., on a field-programmable gate array (FPGA) or other application-specific integrated circuit (ASIC). Accordingly, a gateway may comprise any software and/or hardware to support the communication protocol(s), which comprises the one or more APIs (e.g., file transfer triggers, asynchronous message events, or the like).

For input devices 111a, 111b, and 111c, authentication may be credential-based (e.g., based on a password, a username, an identity (such as a name, Internet protocol (IP) address, or the like) of the input device, or the like. For systems external to the enterprise system 100, authentication may be certificate-based (e.g., such that only external machines with a valid certification may access the APIs).

The structure of enterprise system 100 may provide a software architecture that provides for booting of a cloud-agnostic enterprise system. Accordingly, new enterprise systems and disaster recovery enterprise systems may be provided on many different cloud environments. The cloud agnosticism of system 100 may also provide customization when combined with a common processing engine as described with respect to FIG. 4 and/or FIG. 5.

Figure 2:
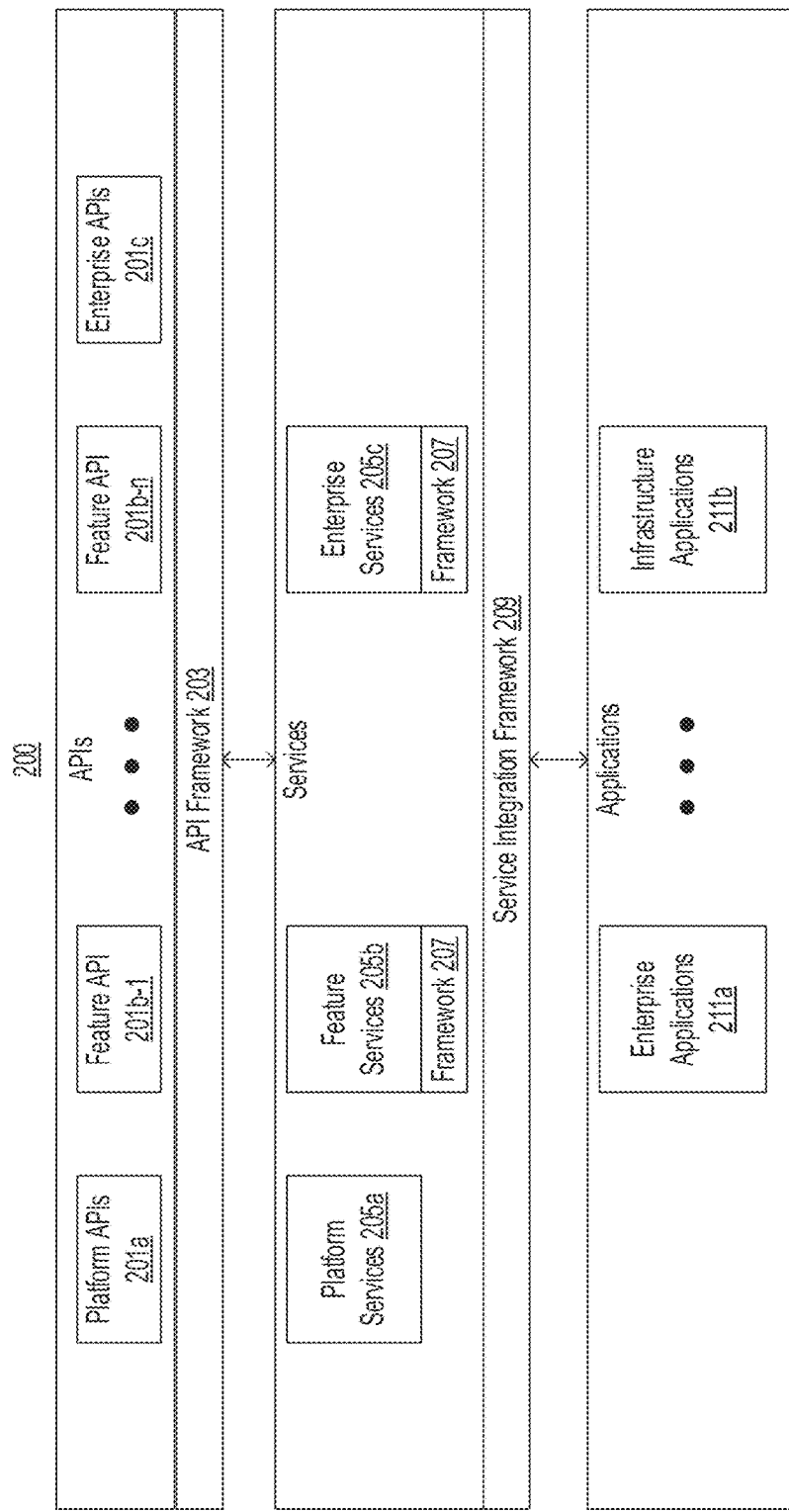
FIG. 2 is a block diagram of exemplary applications, services, and application programming interfaces (APIs) used in the system shown in FIG. 1, consistent with the disclosed embodiments

FIG. 2 is a schematic diagram illustrating a portion of an enterprise system 200, consistent with the disclosed embodiments. For example, the portions depicted in system 200 may form part of enterprise system 100 of FIG. 1, described in further detail above.

As depicted in FIG. 2, an applications layer (e.g., applications layer 103 of enterprise system 100 of FIG. 1) may include one or more enterprise applications 211a. For example, enterprise applications 211a may include one or more of backup software, data management (or database management) software, content management system (CMS) applications, knowledge management (KM) applications, enterprise resource planning (ERP) software, enterprise asset management (EAM) software, accounting and billing software, product data management (PDM) software, supply chain management (SCM) software, or the like.

In some embodiments, enterprise applications 211a may include a platform layer. For example, the platform layer may provide a common processing engine. A common processing engine may comprise a set of software instructions defining at least one common task that may be invoked by applications integrated with the common processing engine. Additionally, the task(s) of the common processing engine may use defined configurations and behaviors that are customizable without modifying the engine directly, as explained below with respect to FIG. 4. The platform layer may include one or more (integrated) extensions. For example, the one or more extensions may comprise plug-in applications. Such plug-in applications may provide custom functions to the enterprise system that are based upon functions provided by the common processing engine. Additionally or alternatively, the one or more extensions may comprise custom configurations. Such configurations may adjust parameters (e.g., away from a default provided by the common processing engine) for one or more functions of the platform (whether provided by the common processing core or an extension application integrated therewith). Accordingly, an extension may comprise a pre-built library (e.g., comprising one or more software functions, subroutines, or other pre-compiled instructions, one or more pre-defined classes or type specifications, one or more values for variables included in the common processing engine, or the like), one or more object files comprising non-executable machine code or intermediate code executable by an interpreter, one or more configuration files comprising plaintext or encoded values, or the like.

These extensions may, in some embodiments, be grouped into categories. For example, the one or more extensions may comprise at least one of a geography-specific extension (e.g., an application and/or configuration providing functions and/or configurations specific to countries or sub-units of countries, such as U.S. states. Chinese provinces, or the like), an institution-specific extension (e.g., an application and/or configuration providing functions and/or configurations specific to an organization deploying the enterprise system, such as different depreciations for utility assets than other institutions, different actuarial formulas for human insurers rather than property insurers, or the like), or a data structure-specific extension (e.g., an application and/or configuration providing functions and/or configurations for custom data formats, or the like). In such embodiments, the data structure-specific extension may comprise at least one of a customer data structure specific extension, an organization data structure specific extension, an alert data structure specific extension, or a ledger data structure specific extension.

The extensions may provide an event-driven architecture. For example, one or more extensions may provide notifications to one or more peripheral systems (e.g., peripheral systems 609a, 611a, and 611b of FIG. 6, described below). The notifications may be in response to internal and/or external events. Accordingly, one or more extensions, either the same or different extensions, may accept input from one or more peripheral systems from which events may be detected.

In addition to, or in lieu of, including the one or more extensions, the platform layer may comprise a plurality of construct sets. A construct may comprise a data structure defining a set of variables and functions that may be customized to provide a custom application that is automatically compatible with (and therefore readily integrable with) a common processing engine without modifications to the engine. For example, similar to the extensions described above, a construct may comprise a pre-built library (e.g., comprising one or more software functions, subroutines, or other pre-compiled instructions, one or more pre-defined classes or type specifications, one or more values for variables included in the common processing engine, or the like), one or more object files comprising non-executable machine code or intermediate code executable by an interpreter, one or more configuration files comprising plaintext or encoded values, or the like.

The construct sets may therefore provide a base set of functions and configurations that may be modified and/or expanded using plug-in applications and/or custom configurations, as explained above. For example, the plurality of construct sets may comprise a product definition construct set, an arrangement management construct set, and a transaction processing construct set. These three construct sets may provide a basic common processing engine, but in some embodiments additional constructs may be implemented. For example, in some embodiments, the plurality of construct sets may further comprise at least one of a pricing definition construct set or an account processing construct set.

In one example, a product definition construct set may define attributes, such as a product code, a produce name, a product status, or the like. In addition, the product definition construct set may further define product conditions. For example, the product conditions may define one or more rules related to availability, purchase, or the like of the product (e.g., a list of valid values, a range of values, or the like).

Additionally or alternatively, an arrangement management construct set may define attributes, such as an account identifier, an account title, an account status, or the like. In addition, the arrangement management construct set may further define arrangement relationships. For example, the relationships may define related accounts and actions that may be taken between an account defined by an arrangement management construct and the related accounts (e.g., transfers or the like).

Additionally or alternatively, a transaction processing construct set may define attributes for each type of transaction as well as behaviors (e.g., functions or the like) associated with each type of transaction. In addition, the transaction processing construct set may define balance types applicable to an account (e.g., defined by an arrangement management construct) as well as patterns of each balance type (e.g., event-driven changes, time-driven changes, or the like), one or more rules for changing balances, and computation formulas (e.g., interest calculations, fee calculations, or the like).

Additionally or alternatively, a pricing definition construct set may define rate indexes and one or more rules on applying the rate indexes (e.g., annually, monthly, daily, or the like) and/or selecting a rate index if a plurality of rate indexes apply to a same price type (e.g., selecting a minimum, selecting a maximum, or the like). In addition, the pricing definition construct set may define one or more rules on applying changes in values of rates in the rate indexes. Furthermore, the pricing definition construct set may comprise a schedule of instructions that apply to products (e.g., defined by product definition constructs). The instructions may define a pattern of a particular charge (e.g., event-driven charges, period charges, accrual-based charges, or the like).

Additionally or alternatively, an account processing construct set may comprise instructions to apply charges at defined times using rules (e.g., defined by the pricing definition construct set) and/or instructions to accrue charges according to an accrual pattern (e.g., defined by the pricing definition construct set).

Additionally or alternatively, the applications layer may include one or more infrastructure applications 211b. In some embodiments, infrastructure applications 211b may include one or more applications managing access to the enterprise system. For example, enterprise applications 211a may include an application implementing authentication of one or more administrators of the enterprise system, an application implementing authentication of one or more customers of the enterprise system, or the like. Infrastructure applications 211b may further include one or more applications managing access to virtual data stores of the enterprise system (e.g., first virtual data store 101-1, second virtual data store 101-2, . . . , nth virtual data store 101-n of enterprise system 100 of FIG. 1). For example, infrastructure applications 211b may permit other applications in the applications layer to access only portions of the data stores. In other embodiments, the virtual data stores may be accessible within the enterprise system and only protected from external access.

As further depicted in FIG. 2, a services layer (e.g., services layer 105 of enterprise system 100 of FIG. 1) may depend on a service integration framework 209. For example, framework 209 may govern the services layer to ensure that the services therein cooperate to provide seamless access between users of enterprise system 200 and applications in the applications layer rather than sending colliding requests throughout enterprise system 200. Platform services 205a may provide a platform for other applications within the layer. For example, platform services 205a may provide operating-system-level virtualization such that the applications of the applications layer may execute within a container.

Feature services 205b may be built on a platform 207 for microservices. The platform may be provided by the cloud environment of enterprise system 200 and/or by platform services 205a. Feature services 205b may provide services to users of enterprise system 200 (e.g., to allow customers to access accounts and perform changes thereto or the like). Accordingly, although not depicted in FIG. 2, feature services 205b may provide the one or more APIs such that customers, administrators, or the like may activate feature services 205b.

Enterprise services 205c may also be build on platform 207. Enterprise services 205c may provide metrics and enterprise-level information to administrators of the system. Enterprise services 205c may also provide for changes to be made on the enterprise level, e.g., manually adjusting the scaling of one or more applications or services of enterprise system 200 to improve performance.

The APIs on the services layer may be built on API framework 203. A framework may comprise hardware and/or software providing API management, such as security, rate limiting, or the like. The framework may be provided by the cloud environment of enterprise system 200 and/or by framework 207 of the services layer. APIs may be categorized as platform APIs 201a (e.g., providing access for information technology administrators), feature APIs 201b-1, . . . , 201b-n (e.g., providing customers and employees access to various services), and enterprise APIs 201c (e.g., providing access for enterprise administrators). Platform APIs 201a may provide the most open access to platforms and frameworks of the enterprise system itself, allowing adjustment thereto. In embodiments where the applications layer includes a common processing engine, adding, modifying, and removing extensions may also be performed through platform APIs 201a. Enterprise APIs 201c may provide access to configurations of the enterprise system (e.g., scaling parameters thereof) but not necessarily to make changes to the platforms, frameworks, and common processing engine thereof. Feature APIs 201b-1, . . . , 201b-n provide the least access, allowing a user to access only those functions and information to which (s)he is entitled based on their credentials (e.g., a customer may only see their own accounts, an employee may only activate certain services, etc.).

Figure 3:
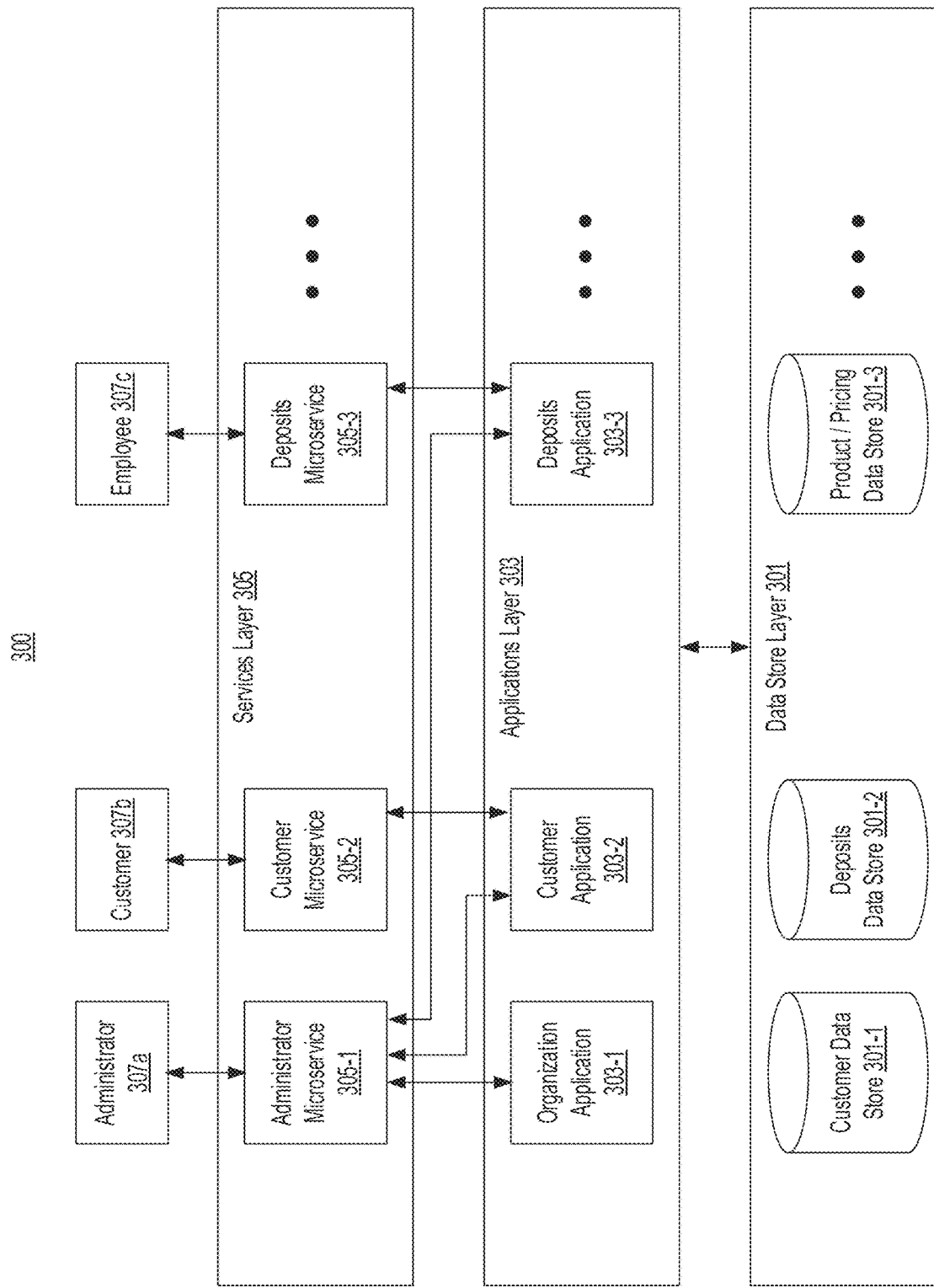
FIG. 3 is a block diagram of examples of inputs to the system shown in FIG. 1, consistent with the disclosed embodiments.

FIG. 3 is a block diagram of an exemplary architecture 300 for routing inputs within the enterprise system 100 shown in FIG. 1. As depicted in FIG. 3, a data store layer 301 (which may, for example, comprise data store layer 101 of enterprise system 100 of FIG. 1) may include at least one customer data store (e.g., data store 301-1), at least one deposits data store (e.g., data store 301-2), and at least one product data store and/or pricing data store (e.g., data store 301-3). Additional or alternative data stores may be used in architecture 300, e.g., a data store for facilities associated with enterprise system 100, a data store for employees associated with enterprise system 100, or the like.

Data store layer 301 may be accessed by an applications layer 303 (which may, for example, comprise applications layer 103 of enterprise system 100 of FIG. 1). As depicted in FIG. 3, applications layer 303 may include at least one organization application 303-1, at least one customer application 303-2, and at least one deposits application 303-3. Additional or alternative applications may be used in architecture 300, e.g., an application for peripherals associated with enterprise system 100 (as explained below with respect to FIG. 6), an application for premiums associated with enterprise system 100, or the like.

As explained above with respect to FIG. 1, each application may be self-contained. Accordingly, if at least one organization application 303-1 (and/or at least one customer application 303-2 and/or at least one deposits application 303-3) comprises a plurality of applications, each application may comprise a user-space-instance isolated from the others. Although not depicted in FIG. 3, the plurality of applications may communicate with each other in addition to retrieving data from and storing data in data store layer 301.

As further depicted in FIG. 3, a services layer 305 (which may, for example, comprise services layer 105 of enterprise system 100 of FIG. 1) may include at least one administrator microservice 305-1, at least one customer microservice 305-2, and at least one deposits microservice 305-3. For example, at least one administrator application 305-1 may provide authentication services to one or more administrators (e.g., administrator 307a) of enterprise system 300, provide parameters adjustment (e.g., parameters controlling scaling of microservices, applications, or the like) services to administrator 307a, or access to any other functions included in at least one organization application 303-1, at least one customer application 303-2, and at least one deposits application 303-3 to which administrator 307a has permissions to access. At least one customer microservice 305-2 may provide authentication services to one or more customers (e.g., customer 307b) of enterprise system 300, provide transaction functions (e.g., performing a deposit, performing a transfer, requesting transaction authorization, or the like) services to customer 307b, or access to any other functions included in at least one customer application 303-2 to which customer 307b has permissions to access. Moreover, at least one deposits microservice 305-3 may provide authentication services to one or more employees (e.g., employee 307c) of enterprise system 300, provide deposit functions (e.g., performing a deposit, cancelling a deposit, requesting a balance, or the like) services to employee 307c, or access to any other functions included in at least one deposit application 303-3 to which employee 307c has permissions to access.

Additional or alternative microservices may be used in architecture 300, e.g., a microservice for peripherals associated with enterprise system 100 (as explained below with respect to FIG. 6), a microservice for insurance premiums associated with enterprise system 100, or the like. In some embodiments, one or more of the microservices may periodically activate one or more enterprise functions provided by the one or more applications without input. For example, an interest microservice in at least one deposits microservice 305-3 may activate depository and account functions included in at least one deposits application 303-3 on a monthly basis to automatically calculate interest and update accounts accordingly. In another example, a report microservice in at least one administrator microservice 305-1 may activate functions to generate reports about the status of enterprise system 300 in at least one organization application 303-1 on a periodic basis such that administrator 307a may access those periodic reports.

Figure 4:
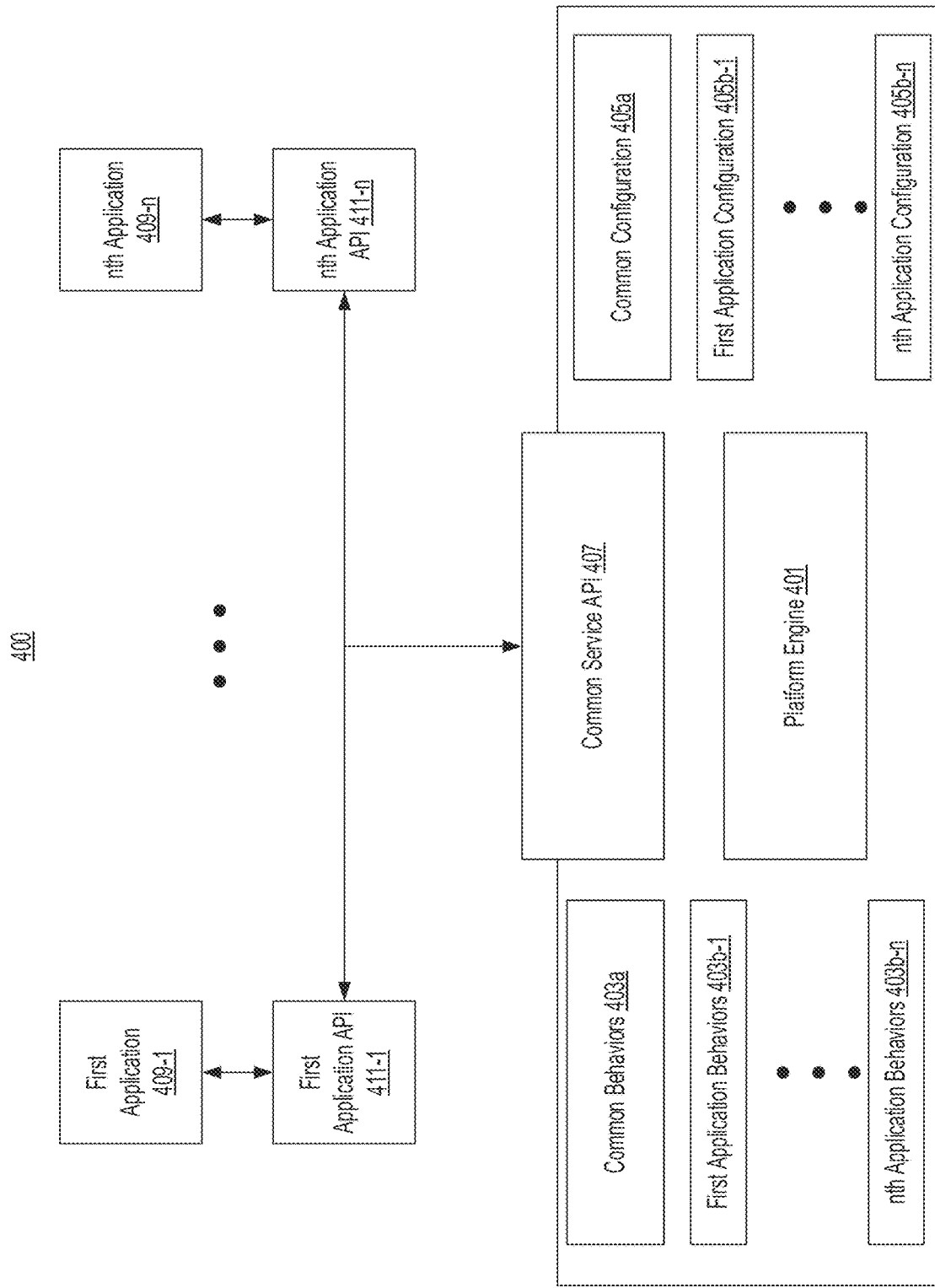
FIG. 4 is a block diagram of an exemplary common processing engine, consistent with the disclosed embodiments.

FIG. 4 is a block diagram of an exemplary common processing engine 400, e.g., for use in an enterprise system such as enterprise system 100 of FIG. 1. As depicted in FIG. 4, a platform engine 401 may provide one or more common services through API 407. For example, common services may include interest calculations, deposit updates, transaction processing, risk computations, or any other function generically reproduceable across enterprise systems for organizations of the same type (e.g., utility, insurance, banking, or the like). These common services may be governed using a common configuration 405a and common behaviors 403a. Common configuration 405a may comprise one or more data structures of common variables and default values for use by the common services. A configuration may therefore be stored as a plaintext configuration file, an encoded set of values, a set of attributes stored in a database, or the like. Common behaviors 403a may comprise one or more data structures defining default functions provided by platform engine 401 for use in particular tasks. A behavior may therefore comprise a pre-built library (e.g., comprising the one or more software functions, one or more subroutines, or other pre-compiled instructions), one or more object files comprising non-executable machine code or intermediate code executable by an interpreter, or the like.

Common processing engine 400 may be further customized. For example, a plurality of custom applications (e.g., first application 409-1, . . . , nth application 409-1) may connected to common service API 407 of platform engine 401 via corresponding APIs (e.g., first application API 411-1, . . . , nth application API 411-n). For example, an application may comprise executable machine code, an object file comprising non-executable machine code, intermediate code executable by an interpreter, or the like. Similar to common configuration 405a and common behaviors 403a, corresponding configurations (e.g., first application configuration 405b-1, . . . , nth application configuration 405b-1) and corresponding behaviors (e.g., first application behaviors 403b-1, . . . , nth application behaviors 403b-1) may define variables and values as well as functions for particular tasks, respectively, for the custom applications.

The structure of common processing engine 400 may provide a software architecture that, combined with the containerization described with respect to FIGS. 1-3 above, provides for faster and more resource-efficient booting of an enterprise system. Accordingly, new enterprise systems and disaster recovery enterprise systems may be provided on the order of days or even hours rather than weeks or even months. The efficiency of integrating the customized applications (as well as corresponding configurations and behaviors) with engine 400 may be increased further by using constructs as explained below with respect to FIG. 5.

Figure 5:
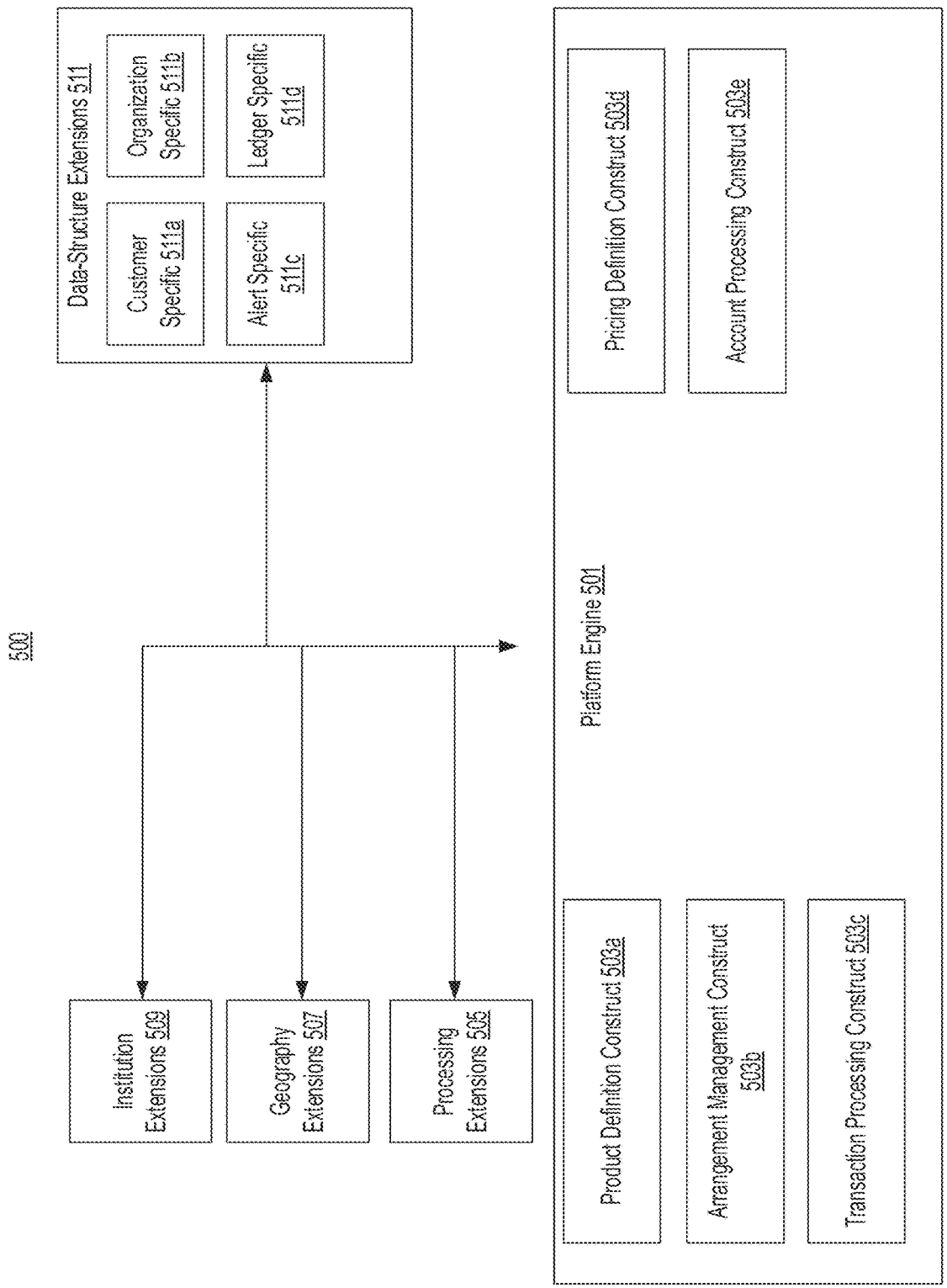
FIG. 5 is a block diagram of the exemplary processing engine of FIG. 4 with exemplary extensions and construct sets, consistent with the disclosed embodiments.

FIG. 5 is a block diagram of an exemplary common processing engine 500, e.g., for use in an enterprise system such as enterprise system 100 of FIG. 1. Common processing engine 500 may comprise common processing engine 400 of FIG. 4 with exemplary extensions and construct sets as depicted in FIG. 5. As depicted in FIG. 5, platform engine 501 may include at least a product definition construct set 503a (e.g., defining a data structure for a product and functions associated with that product), an arrangement management construct set 503b (e.g., defining a data structure for a relationship between a customer a product defined using product definition construct set 503a), and a transaction processing construct set 503c (e.g., defining a data structure for a transaction and its corresponding approval or authorization). Additionally, as depicted in FIG. 5, platform engine 501 may provide at least one of a pricing definition construct 503d set (e.g., defining a data structure for a pricing model of a product defined using product definition construct set 503a) and account processing construct set 503e (e.g., defining a data structure for different types of charge processing).

In addition to or in lieu of the construct sets depicted in FIG. 5, platform engine 501 may include integrated extensions such that configurations and behaviors may be changed from one default set to another default set. For example, processing extensions 505 may provide definitions of processing steps for custom applications (such as first application API 411-1, . . . , nth application API 411-n of FIG. 4). Accordingly, processing extensions 505 may comprise, at least in part, first application configuration 405b-1, . . . , nth application configuration 405b-1 of FIG. 4 and first application behaviors 403b-1, . . . , nth application behaviors 403b-1 of FIG. 4. Moreover, geography extensions 507 may define a set of configurations and behaviors specific to a country (e.g., with respect to tax implications, disclosure regulations, or the like) or to a region within a country (e.g., specific to a U.S. state, specific to a Chinese province, or the like). Similarly, institution extensions 509 may define a set of configurations and behaviors specific to the institution using platform engine 501 (e.g., a set of fuel types used by the specific utility, a set of risk formulas used by the specific insurer, a set of accounts types used by the specific bank, or the like).

As further depicted in FIG. 5, one or more data-structure extensions 511 may allow platform engine 501 to read from and write to data stored in a format custom to the organization using platform engine 501. Extensions 511 may include, for example, customer-specific extensions 511a (e.g., defining how customer records are stored and retrieved), organization-specific extensions 511b (e.g., defining how global records, such as revenue, expenses, taxes, or the like are stored and retrieved), alert-specific extensions 511c (e.g., defining how alerts for a push alert service, an email alert service, or any other alert service used by the organization should be structured to ensure proper delivery and formatting), ledger-specific extensions 511d (e.g., defining how ledgers, such as deposit account ledgers, investment account ledgers, or the like are stored and retrieved), or the like.

The structure of common processing engine 500 may provide a software architecture that provides for more flexible booting of an enterprise system. Accordingly, new enterprise systems and disaster recovery enterprise systems may be customized to customers while remaining efficient to boot. The flexibility with engine 500 may be increased further by using custom applications as explained above with respect to FIG. 4.

Figure 6:
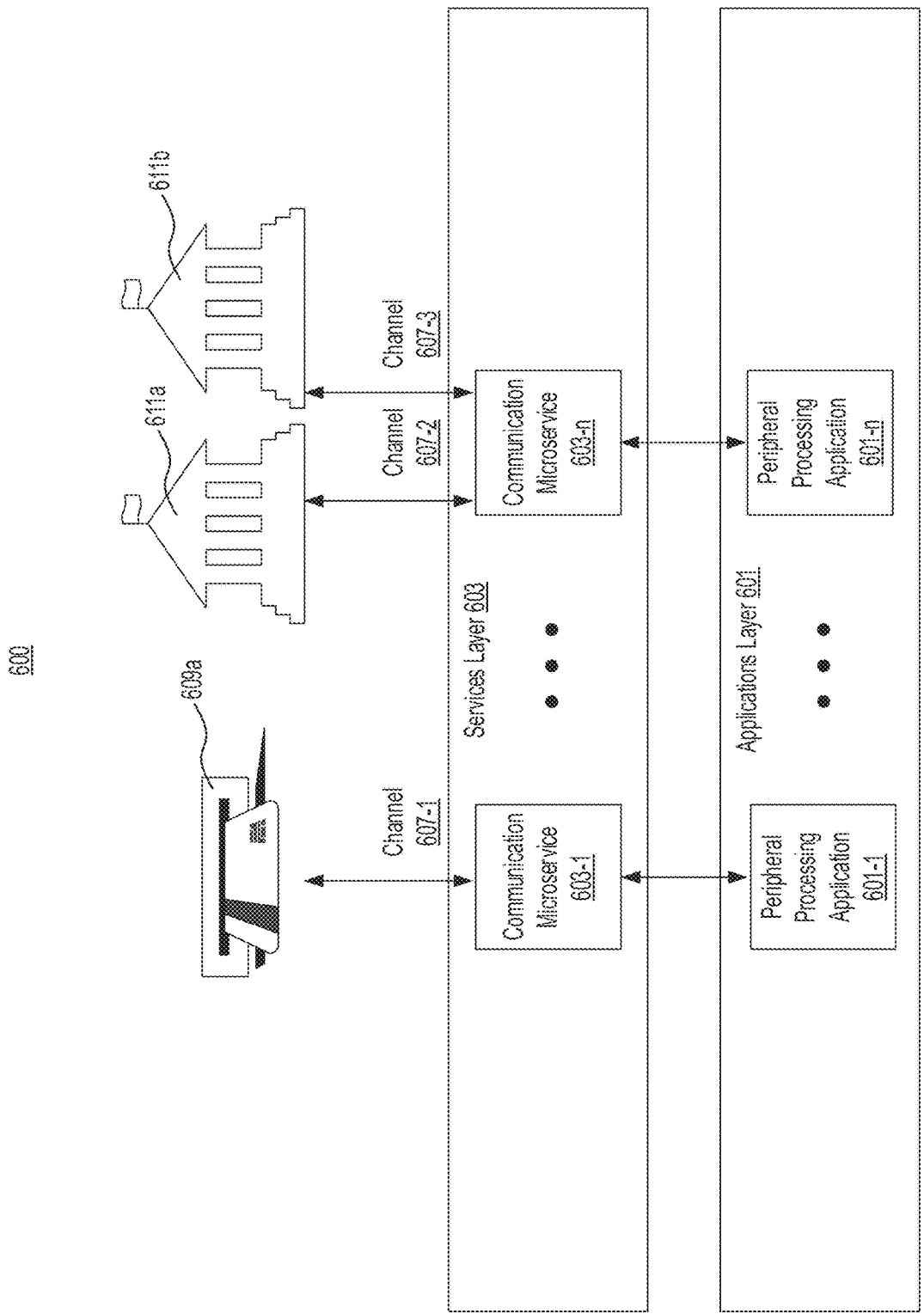
FIG. 6 is a block diagram of an exemplary integration of peripherals into an enterprise system, consistent with the disclosed embodiments.

FIG. 6 is a block diagram of an exemplary integration 600 of peripherals into an enterprise system, e.g., enterprise system 100 of FIG. 1. As depicted in FIG. 6, one or more peripheral processing applications (e.g., peripheral processing application 601-1, . . . , peripheral processing application 601-n) may process incoming data from one or more peripheral systems (e.g., a point-of-sale and/or transaction processing system 609a, an external bank system 611a, the Federal Reserve system 611b, or the like) and provide outgoing data to the same. Although not depicted in FIG. 6, peripheral processing application 601-1, . . . , peripheral processing application 601-n may update records on one or more data stores of enterprise system 600 when processing incoming data (and/or outgoing data).

As further depicted in FIG. 6, corresponding communication microservices (e.g., communication microservice 603-1, . . . , communication microservice 603-n) may provide secure channels (e.g., channels 607-1, 607-2, and 607-3) to the peripheral systems such that data from the peripheral systems may be processed by peripheral processing application 601-1, . . . , peripheral processing application 601-n. Accordingly, similar to how first microservice 105-1 of FIG. 1 activates functions of one or more applications (e.g., first application 103-1) and provides API 107-1 for one or more input devices (e.g., input device 111a), communication microservice 603-1 may activate functions of peripheral processing application 601-1 and may provide secure channel 607-1 for peripheral system 609a. Similarly, communication microservice 603-n may activate functions of peripheral processing application 601-n and may provide secure channels 607-2 and 607-3 for peripheral systems 611a and 611b.

The secure channels may allow peripheral processing application 601-1, . . . , peripheral processing application 601-n to send commands and other outgoing data to the peripheral systems. Some microservices (e.g., communication microservice 603-1) may provide a single channel to a single system while other microservices (e.g., communication microservice 603-*n*) may provide a plurality of channels, either to the same peripheral system or (as depicted in FIG. 6) to different peripheral systems. The communication microservices may function as batch schedulers or arbiters for incoming requests such that peripheral processing application 601-1, . . . , peripheral processing application 601-*n* may process incoming data without collisions.

Accordingly, at least one application (e.g., peripheral processing application 601-1, . . . , peripheral processing application 601-*n*) may provide at least one peripheral processing function (e.g., sending commands to a peripheral system such as a point-of-sale and/or transaction processing system 609*a*, an external bank system 611*a*, the Federal Reserve system 611*b*, or the like; receiving inputs from the peripheral system; or the like), and at least one microservice (e.g., communication microservice 603-1, . . . , communication microservice 603-*n*) may process input from and output to at least one peripheral system (e.g., a point-of-sale and/or transaction processing system 609*a*, an external bank system 611*a*, the Federal Reserve system 611*b*, or the like). Accordingly, after initializing at least one communication channel (e.g., secure channels 607-1, 607-2, 607-3, or the like) with at least one peripheral system (e.g., a point-of-sale and/or transaction processing system 609*a*, an external bank system 611*a*, the Federal Reserve system 611*b*, or the like), the at least one microservice in communication with the at least one application may process input from output to the at least one peripheral system.

In one example, the at least one application (e.g., peripheral processing application 601-1, . . . , peripheral processing application 601-*n*) may comprise an automated clearing house (ACH) incoming file application (e.g., to parse ACH files from other banks, from the Federal Reserve, or from a clearing house), an ACH outgoing file application (e.g., to assemble ACH files for transfers to another bank), an ACH incoming return application (e.g., to process ACH files that result in an exception or other error), or an ACH outgoing return application (e.g., to handle outgoing transfers that result in an exception or other error). Additionally or alternatively, the at least one microservice (e.g., communication microservice 603-1, . . . , communication microservice 603-*n*) may comprise a batch scheduler for ACH incoming files (e.g., to bundle incoming ACH files for batch processing at the end of a day, the beginning of a day, or other specified time period), or a batch scheduler for ACH outgoing files (e.g., to bundle ACH transfers for batch assembling into ACH files at the end of a day, the beginning of a day, or other specified time period). The batch scheduler may be connected through a secure channel (e.g., secure channels 607-1, 607-2, 607-3, or the like) to a clearing house (CH).

In another example, the at least one application (e.g., peripheral processing application 601-1, . . . , peripheral processing application 601-*n*) may comprise an automated teller machine (ATM) withdrawal application (e.g., to post withdrawals from ATM machines to appropriate accounts and process any charges, such as ATM fees, accordingly), or an ATM deposit application (e.g., to post deposits from ATM machines to appropriate accounts and process any charges, such as ATM fees, accordingly). Additionally or alternatively, the at least one microservice (e.g., communication microservice 603-1, . . . , communication microservice 603-*n*) may comprise a scheduler for ATM deposits (e.g., to avoid collisions for processing deposits), or a scheduler for ATM withdrawals (e.g., to avoid collisions for processing withdrawals). The scheduler may be connected through a secure channel (e.g., secure channels 607-1, 607-2, 607-3, or the like) to at least one peripheral driver associated with at least one ATM (e.g., a driver installed at the ATM and/or a driver provided in the cloud environment with the scheduler).

In another example, the at least one application (e.g., peripheral processing application 601-1, . . . , peripheral processing application 601-*n*) may comprise a point of sale (POS) authentication application (e.g., to authenticate a point-of-sale system for posting to authorized accounts), or a card status management application (e.g., to update theft status, remaining credit limit, balances, or the like of cards associated with accounts). Additionally or alternatively, the at least one microservice (e.g., communication microservice 603-1, . . . , communication microservice 603-*n*) may comprise a scheduler for POS transactions (e.g., to avoid collisions for processing transactions from POS systems), or a scheduler for card status updates (e.g., to avoid collisions for processing updates to card statuses). The scheduler may be connected through a secure channel (e.g., secure channels 607-1, 607-2, 607-3, or the like) to at least one peripheral driver associated with at least one POS system.

In another example, the at least one application (e.g., peripheral processing application 601-1, . . . , peripheral processing application 601-*n*) may comprise an incoming substitute check file application (e.g., to parse check files from other banks, from the Federal Reserve, or from a clearing house), an outgoing substitute check file application (e.g., to assemble check files for transfers to another bank), an incoming substitute check return application (e.g., to process check files that result in an exception or other error), or an outgoing substitute check return application (e.g., to handle outgoing transfers that result in an exception or other error). Additionally or alternatively, the at least one microservice (e.g., communication microservice 603-1, . . . , communication microservice 603-*n*) may comprise a batch scheduler for substitute check incoming files (e.g., to bundle incoming check files for batch processing at the end of a day, the beginning of a day, or other specified time period), or a batch scheduler for substitute check outgoing files (e.g., to bundle check transfers for batch assembling into check files at the end of a day, the beginning of a day, or other specified time period). The batch scheduler may be connected through a secure channel (e.g., secure channels 607-1, 607-2, 607-3, or the like) to at least one of a bank or the Federal Reserve.

In another example, the at least one application (e.g., peripheral processing application 601-1, . . . , peripheral processing application 601-*n*) may comprise a web access authentication application (e.g., to authenticate customers to a web portal for one or accounts associated with the customers), an account transfer application (e.g., to process internal transfers between accounts, whether associated with the same customer or different customers), or an account history application (e.g., to out account histories for display, printing, or other output). Additionally or alternatively, the at least one microservice (e.g., communication microservice 603-1, . . . , communication microservice 603-*n*) may comprise an account information retrieval service (e.g., to assemble account histories based on approved transactions to the accounts), or an account transaction service (e.g., to retrieve approved transactions in response to customer input).

Figure 7:
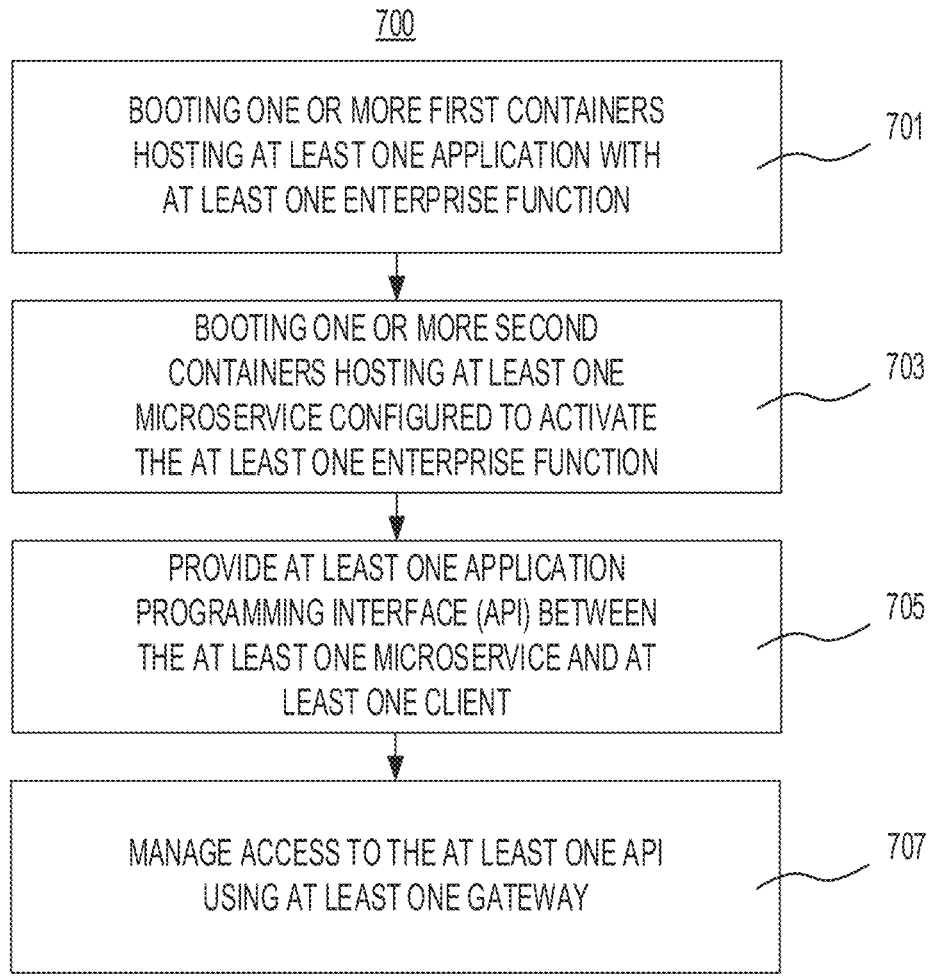
FIG. 7 is a flowchart of an exemplary method for deploying an enterprise system in a cloud environment, consistent with the disclosed embodiments.

FIG. 7 is a flowchart of an exemplary method 700 for deploying an enterprise system in a cloud environment, consistent with the disclosed embodiments. For example, method 700 may be performed by one or more processors in order to implement enterprise system 100 of FIG. 1. Referring to FIG. 7, method 700 may include the following steps.

In step 701, the one or more processors boot one or more first containers using operating-system-level virtualization. For example, the one or more first containers may host at least one application (e.g., first application 103-1, second application 103-2, nth application 103-n, or the like) with at least one enterprise function. In some embodiments, each container of the one or more first containers may host only one application. As further explained above with respect to FIG. 3, the at least one application may comprise an application implementing authentication of one or more administrators of the enterprise system or an application implementing authentication of one or more customers of the enterprise system.

Additionally or alternatively, and as explained above with respect to FIGS. 4 and 5, the at least one application may comprise a platform layer (e.g., platform engine 501) with one or more extensions (e.g., extensions 505, 507, 509, 511, or the like). For example, the one or more extensions may be integrated with the platform layer. Additionally or alternatively, the one or more extensions may comprise at least one of a geography-specific extension 507, an institution-specific extension 509, or a data structure-specific extension 511. In such embodiments, the data structure-specific extension 511 may comprise at least one of a customer data structure specific extension 511a, an organization data structure specific extension 511b, an alert data structure specific extension 511c, or a ledger data structure specific extension 511d.

In addition to or in lieu of including the one or more extensions, the platform layer (e.g., platform engine 501) may comprise a plurality of construct sets (e.g., construct sets 503a, 503b. 503c, 503d, 503e, or the like). For example, the plurality of construct sets may comprise a product definition construct set 503a, an arrangement management construct set 503b, and a transaction processing construct set 503c. In some embodiments, the plurality of construct sets may further comprise at least one of a pricing definition construct set 503d or an account processing construct set 503e.

In step 703, the one or more processors boot one or more second containers using operating-system-level virtualization. For example, the one or more second containers may host at least one microservice (e.g., first microservice 105-1, second microservice 105-2, nth microservice 105-n, or the like) configured to activate the at least one enterprise function of the at least one application (e.g., first application 103-1, second application 103-2, nth application 103-n, or the like). In some embodiments, each container of the one or more second containers may host only one microservice.

In step 705, the one or more processors provide at least one application programming interface (e.g., API 107-1, API 107-2, API 107-3, or the like) between the at least one microservice (e.g., first microservice 105-1, second microservice 105-2, nth microservice 105-n, or the like) and at least one client. The at least one client may comprise an input device (e.g., input device 111a, input device 111b, input device 111c, or the like) and/or a system external to the enterprise system 100. The input device may comprise a device associated with a customer, a device associated with an employee, or a device associated with a system administrator. In such embodiments, the at least one microservice (e.g., first microservice 105-1, second microservice 105-2, nth microservice 105-n, or the like) may be configured to activate the at least one enterprise function of the at least one application (e.g., first application 103-1, second application 103-2, nth application 103-n, or the like) based on input from the input device (e.g., input device 111a, input device 111b, input device 111c, or the like).

In step 707, the one or more processors manage access to the at least one API (e.g., API 107-1, API 107-2, API 107-3, or the like) using at least one gateway (e.g., gateway 109). In some embodiments, the at least one gateway (e.g., gateway 109) may comprise a unified gateway providing log-in services to the at least one client. Additionally or alternatively, the at least one gateway (e.g., gateway 109) may apply one or more access policies to determine whether the at least one client is permitted to access the at least one microservice through of the at least one API (e.g., API 107-1, API 107-2, API 107-3, or the like).

Consistent with the disclosed embodiments, the one or more processors may further scale at least one container of the one or more first containers or the one or more second containers. For example, the scaling may be based on a measured performance indicator. Additionally or alternatively, the scaling may be based on one or more configuration settings associated with the enterprise system. The scaling may comprise duplication of at least one container and a corresponding application or a corresponding microservice hosted therein.

In embodiments where the enterprise system comprises a banking core, the at least one application (e.g., first application 103-1, second application 103-2, nth application 103-n, or the like) may comprise an application implementing authentication of one or more administrators of the banking core, an application implementing deposits for the banking core, or an application implementing authentication of one or more customers of the banking core. As described above, other cores, such as a utility core, a mining core, a military core, an insurance core, a search engine core, or the like, may be quickly and efficiently booted on an enterprise system in a cloud environment using method 700 of FIG. 7.

Figure 8:
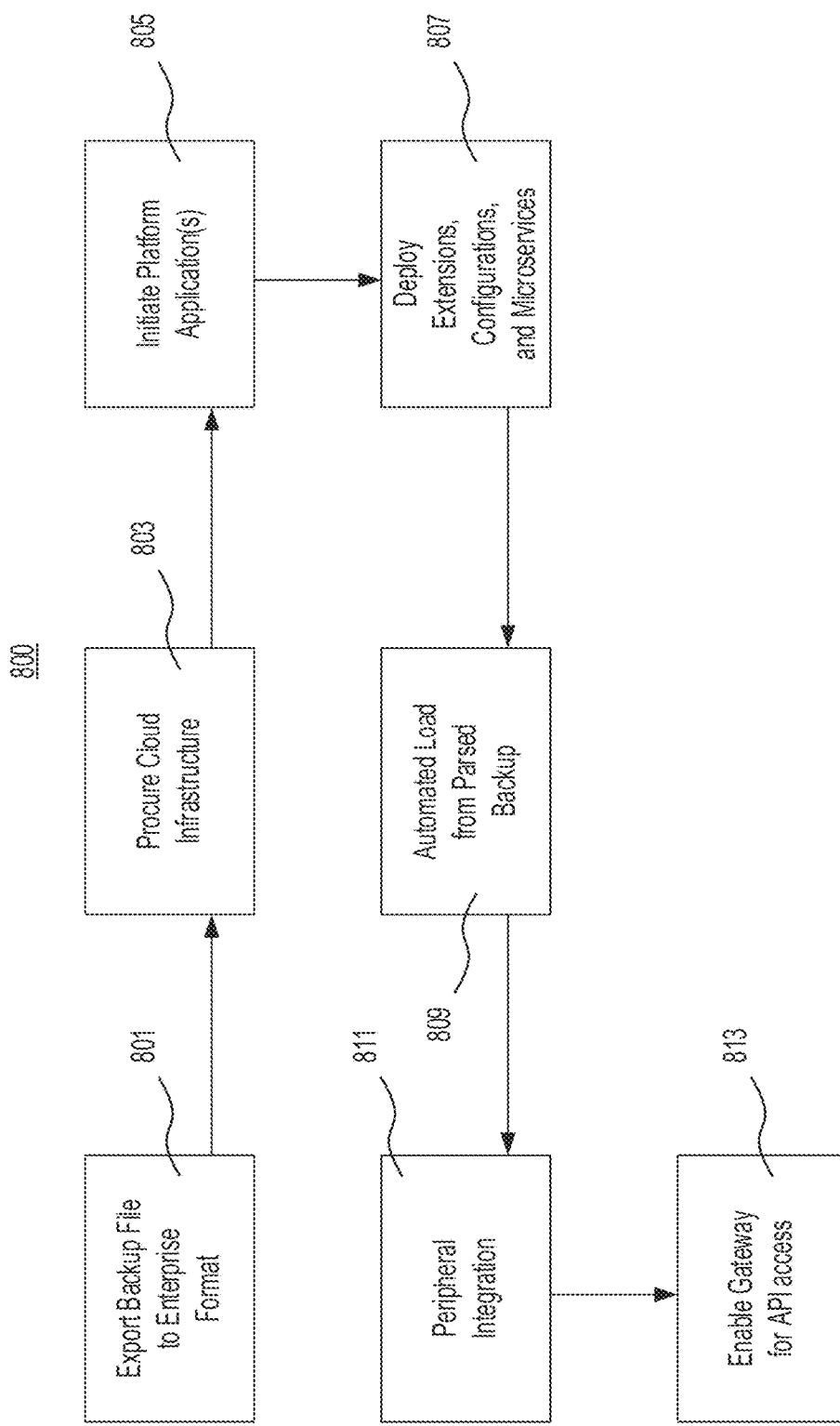
FIG. 8 is a flowchart of an exemplary method for deploying an enterprise system in a disaster recovery scenario, consistent with the disclosed embodiments.

FIG. 8 is a flowchart of an exemplary method 800 for deploying an enterprise system in a cloud environment consistent with the disclosed embodiments. For example, method 800 may be performed by one or more processors in order to implement enterprise system 100 of FIG. 1. Method 800 may be used for deploying a new enterprise system from existing data, to upgrade an enterprise system, or to deploy a new system in response to a disaster or other failure event. Referring to FIG. 8, method 800 may include the following steps.

In step 801, the one or more processors (e.g., one or more processors forming or in communication with a cloud environment in which enterprise system 100 will be deployed) retrieve at least one backup file in a first format and parse the at least one backup file into a second format associated with the enterprise system. For example, the first format may comprise a file format defined by Part 360 of the Federal Deposit Insurance Corporation (FDIC) Rules and Regulations. The second format may comprise any format defined by the enterprise system and used by data stores of the system.

In embodiments where the at least one backup file is encrypted, the one or more processors may further decrypt the at least one backup file before parsing. For example, the one or more processors may retrieve a key (a private key of an asymmetric encryption schema, a cryptographic key of a symmetric encryption schema, or the like) previously provided by one or more administrators for the enterprise system for performing decryption. In such embodiments, the one or more processors may validate integrity of the encrypted at least one backup file and/or validate integrity of the decrypted at least one backup file. These one or more validations may each be based on at least one of a hash of the at least one backup file and/or one or more tags associated with the at least one backup file.

In step 803, the one or more processors procure cloud infrastructure for the enterprise system. For example, the one or more processors may execute one or more scripts to define data stores (e.g., Amazon S3 buckets, Amazon elastic block store (EBS) volumes, structured query language (SQL) databases, NoSQL databases such as ArangoDB databases, or the like), application containers (e.g., Kubernetes pods, FreeBSD jails, Docker containers, or the like), service containers (e.g., Kubernetes pods, FreeBSD jails, Docker containers, or the like), or the like. In some embodiments, the one or more processors may provide authentication to a cloud service in order to procure the infrastructure. The one or more processors may have received the authentication previously from one or more administrators for the enterprise system.

In step 805, the one or more processors initiate one or more platform applications (e.g., common processing engine 400 of FIG. 4 and/of 500 of FIG. 5). For example, the one or more processors may execute one or more scripts to boot the platform application(s) into the procured containers. The platform application(s) may be scaled (e.g., duplicated across procured containers) according to a default configuration either determined by the cloud provider or the one or more administrators.

In step 807, the one or more processors deploy extensions (e.g., processing extensions 505, geography extensions 507, institution extensions 509, data-structure extensions 511, or the like) and configurations (e.g., first application configuration 405*b*-1, nth application configuration 405*b*-*n*, or the like) to the one or more platform applications (e.g., common processing engine 400 of FIG. 4 and/of 500 of FIG. 5) and corresponding microservices (e.g., first microservice 105-1, second microservice 105-2, nth microservice 105-*n*, or the like). For example, the one or more processors may execute one or more scripts to boot the extensions, configurations, and microservices into the procured containers and connect the same to the one or more platform applications by procuring APIs therebetween. The one or more processors may use one or more Helm charts (or another organizational chart associated with a containerization protocol used to procure the containers) to boot the extensions, configurations, and microservices and connect the same together and to the one or more platform applications.

In step 809, the one or more processors store the parsed at least one backup file in one or more virtual data stores (e.g., first virtual data store 101-1, second virtual data store 101-2, nth virtual data store 101-*n*, or the like) at least partially accessible by the one or more first containers (e.g., first application 103-1, second application 103-2, nth application 103-*n*, or the like). Additionally or alternatively, the one or processors may transfer at least a portion of the parsed at least one backup file to booted extensions, configurations, and microservices. For example, the one or more Helm charts (or another organizational chart(s)) may govern distribution of the portion of the parsed at least one backup file to the booted extensions, configurations, and microservices.

In some embodiments, the one or more processors may further encrypt the parsed at least one backup file into an encryption format associated with the enterprise system. In embodiments where the at least one backup file was previously decrypted, the parsed at least one backup file may be re-encrypted using the same encryption schema or a different encryption schema.

In step 811, the one or more processors integrate peripheral systems (e.g., peripheral systems 609*a*, 611*a*, 611*b*, or the like of FIG. 6). For example, as explained above with respect to FIG. 6, booted microservices configured to process data from and provide data to the peripheral systems (e.g., communication microservice 603-1, communication microservice 603-*n*, or the like) may open secure channels (e.g., channels 607-1, 607-2, 607-3, or the like) to the peripheral systems and re-route the peripheral systems to the new addresses of the opened channels.

In step 813, the one or more processors enable at least one gateway (e.g., gateway 109) for input devices to access APIs (e.g., APIs 107-1, 107-2, 107-3, or the like) provided by booted microservices (e.g., first microservice 105-1, second microservice 105-2, nth microservice 105-*n*, or the like). In some embodiments, the enabled gateway may be configured for old credentials of external systems and users and/or may provide a mechanism for external systems and user to establish new credentials with the enterprise system (e.g., as explained below with respect to method 900).

Figure 9:
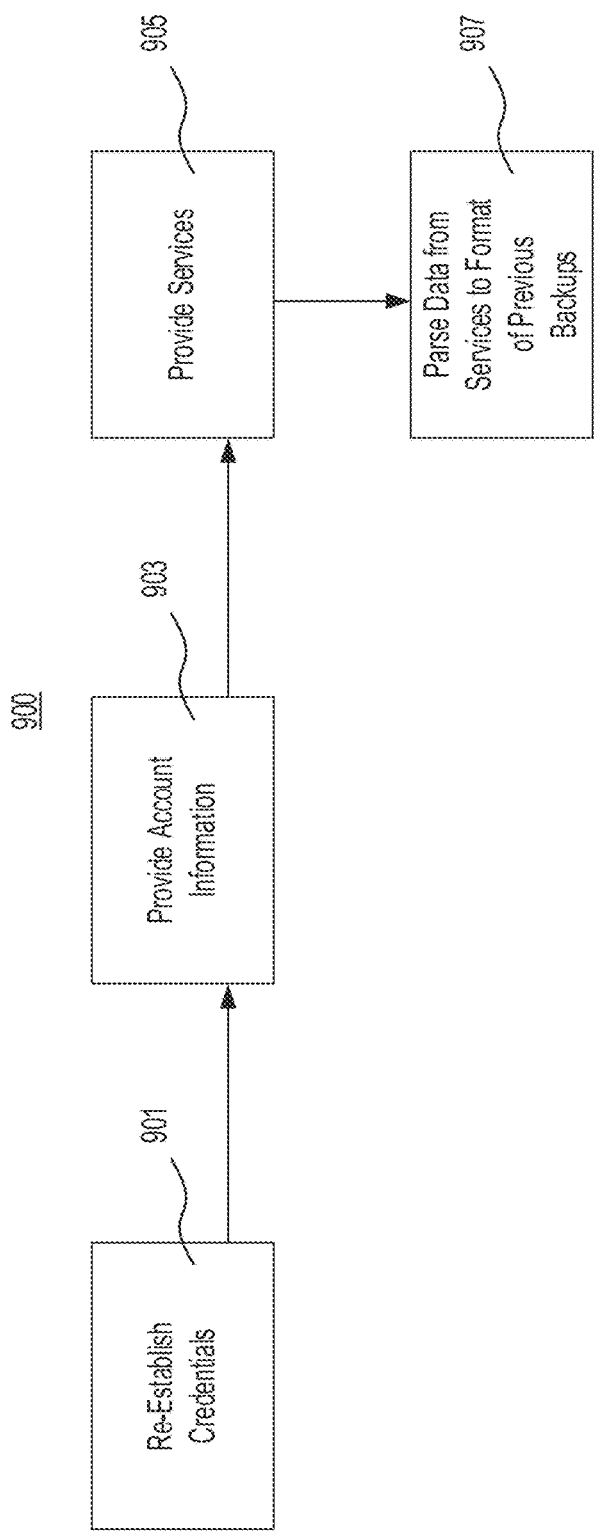
FIG. 9 is a flowchart of an exemplary method for providing user access to an enterprise system deployed as part of a disaster recovery scenario, consistent with the disclosed embodiments.

FIG. 9 is a flowchart of an exemplary method 900 for providing user access to an enterprise system deployed as part of a disaster recovery scenario, system upgrade scenario, or new-deployment scenario consistent with the disclosed embodiments. For example, method 900 may be performed by one or more processors in order to grant access to customers, employees, administrators, or the like of enterprise system 100 of FIG. 1. Referring to FIG. 9, method 900 may include the following steps.

In step 901, the one or more processors re-establish (or establish) credentials for a user (or system). For example, the one or more processors may provide a series of questions to a user to confirm identity or may request one or more keys, certificates, or the like from the system to confirm authorization. After confirmation of identity or authorization, the one or more processors may provide a mechanism for generating new credentials (e.g., a username and password, a biometric indicator, a certificate, or the like).

In step 903, the one or more processors provide account information to the user or system. For example, the one or more processors may access one or more data stores on the enterprise system to retrieve the account information. In some embodiments, the one or more processors may request confirmation from the user or system that the account information is valid as compared with the previous account information on a previous enterprise system. In such embodiments, the one or more processors may require troubleshooting if the user or system cannot verify the validity of the account information before proceeding to step 905.

In step 905, the one or more processors provide services to the user or system. For example, the one or more processors may provide deposit services, transfer services, transaction services, or the like. In step 907, when execution a service requested by the user or system, the one or more processors may update the data stores using a corresponding microservice and then parse the changes to the data stores into a format associated with previous backups (e.g., at least one backup file from which the enterprise system was booted). In one example, the one or more processors may parse all changes to the data stores into the 360 format and continue to store backup files in the 360 format in addition to updating the data stores of the enterprise system.

Another aspect of the disclosure is directed to a non-transitory computer-readable medium storing instructions which, when executed, cause one or more processors to perform the disclosed methods. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed systems and related methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A system for deploying an enterprise system in a cloud environment, comprising at least one memory storing instructions and at least one processor configured to provide:
   one or more first containers hosting at least one application, the application comprising at least one enterprise function and a platform layer with one or more extensions, the platform layer comprising a plurality of construct sets, wherein at least one of the plurality of the construct sets includes one or more data structures defining a set of variables and functions to provide one or more custom application features;
   one or more second containers hosting at least one microservice configured to activate the at least one enterprise function; and
   at least one application programming interface (API) between the at least one microservice and at least one client; and
   one or more virtual data stores accessible by the one or more first containers, the one or more virtual data stores comprising data from at least one backup file,
   wherein the at least one backup file is decrypted before being parsed into a format associated with the one or more first containers and subsequently re-encrypted into a format associated with the one or more first containers.

2. The system of claim 1, wherein the at least one processor is further configured to validate the integrity of the at least one backup file.

3. The system of claim 2, wherein validating the integrity of the at least one backup file is based on a hash of the at least one backup file.

4. The system of claim 2, wherein validating the integrity of the at least one backup file is based on one or more tags associated with the at least one backup file.

5. The system of claim 1, wherein the at least one backup file is re-encrypted using a different schema from a first schema used to encrypt the at least one backup file.

6. The system of claim 1, wherein the at least one client comprises a secondary enterprise system.

7. The system of claim 6, wherein the client is configured to send an input to the microservice to activate one or more of the at least one enterprise functions.

8. The system of claim 7, wherein the secondary enterprise system comprises an input device and the client is configured to send the input to the microservice in response to user input from the input device.

9. The system of claim 6, wherein the at least one client comprises credential-based authentication.

10. The system of claim 1, wherein each container of the one or more first containers hosts only one application.

11. The system of claim 1, wherein each container of the one or more second containers hosts only one microservice.

12. The system of claim 1, wherein the enterprise system comprises a banking core.

13. The system of claim 1, wherein the platform layer comprises a plurality of construct sets.

14. The system of claim 13, wherein the plurality of construct sets comprises a product definition construct set, an arrangement management construct set, and a transaction processing construct set.

15. The system of claim 14, wherein the plurality of construct sets further comprises at least one of a pricing definition construct set or an account processing construct set.

16. A system for deploying an enterprise system in a cloud environment, comprising at least one memory storing instructions and at least one processor configured to provide:
   one or more first containers hosting at least one application, the application comprising at least one enterprise function and a platform layer with one or more extensions, the platform layer comprising a plurality of construct sets, wherein at least one of the plurality of the construct sets includes one or more data structures defining a set of variables and functions to provide one or more custom application features;
   one or more second containers hosting at least one microservice configured to activate the at least one enterprise function;
   at least one application programming interface (API) between the at least one microservice and at least one client;
   one or more virtual data stores accessible by the one or more first containers, the one or more virtual data stores comprising data from at least one backup file; and
   at least one gateway configured to manage access to the at least one API, wherein:
   the at least one application provides at least one peripheral processing function;
   the at least one microservice is configured to process input from and output to at least one peripheral system and in communication with the at least one application; and
   the at least one processor is further configured to:
      decrypt the at least one backup file before parsing the at least one backup file into a format associated with the enterprise system and subsequently re-encrypting the at least one backup file into a format associated with the enterprise system, and
      provide at least one communication channel with the at least one peripheral system, the at least one communication channel configured to receive input from the at least one peripheral system and to transmit output from the at least one microservice to the at least one peripheral system.

17. The system of claim 16, wherein the at least one application comprises an automated clearing house (ACH) incoming file application, an ACH outgoing file application, an ACH incoming return application, or an ACH outgoing return application.

18. The system of claim 16, wherein the at least one application comprises an automated teller machine (ATM) withdrawal application, or an ATM deposit application.

19. The system of claim 16, wherein the at least one microservice comprises a batch scheduler for substitute check incoming files or a batch scheduler for substitute check outgoing files.

20. A method for deploying an enterprise system in a cloud environment, comprising:

providing one or more first containers hosting at least one application, the application comprising at least one enterprise function and a platform layer with one or more extensions, the platform layer comprising a plurality of construct sets, wherein at least one of the plurality of the construct sets includes one or more data structures defining a set of variables and functions to provide one or more custom application features;

providing one or more second containers hosting at least one microservice configured to activate the at least one enterprise function;

providing at least one application programming interface (API) between the at least one microservice and at least one client; and providing one or more virtual data stores accessible by the one or more first containers, the one or more virtual data stores comprising data from at least one backup file;

decrypting the at least one backup file;

parsing the at least one backup file into a format associated with the one or more first containers; and re-encrypting the at least one backup file into a format associated with the one or more first containers.

21. The system of claim 15, wherein the one or more custom application features include any one or more of: product definition, arrangement management, transaction processing, pricing definition, or account processing.

* * * * *